(12) United States Patent
Cragun et al.

(10) Patent No.: US 10,771,548 B2
(45) Date of Patent: Sep. 8, 2020

(54) DATA SYNC ENGINE, METHOD AND SOFTWARE

(71) Applicant: MX Technologies, Inc., Lehi, UT (US)

(72) Inventors: Jason Cragun, Pleasant Grove, UT (US); Adam Hutchison, Provo, UT (US); Lonnie Kyser, Pleasant Grove, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 13/694,520

(22) Filed: Dec. 7, 2012

(65) Prior Publication Data

US 2014/0250242 A1    Sep. 4, 2014

(51) Int. Cl.
*G06F 15/16* (2006.01)
*H04L 29/08* (2006.01)

(52) U.S. Cl.
CPC ................ *H04L 67/1095* (2013.01)

(58) Field of Classification Search
CPC ......... H04L 67/1095; Y10S 707/99952; Y10S 707/99953; G01S 19/14; G01C 15/04; G06F 16/178; G06F 16/1873; G06F 16/2358
USPC .......................................................... 709/204
See application file for complete search history.

(56) References Cited

U.S. PATENT DOCUMENTS

| | | | |
|---|---|---|---|
| 8,489,742 B2 * | 7/2013 | Clubb et al. ................... 709/226 |
| 8,621,025 B2 * | 12/2013 | Ridgard et al. ................ 709/207 |
| 2004/0133622 A1 * | 7/2004 | Clubb et al. ................... 709/200 |
| 2006/0070019 A1 * | 3/2006 | Vishnumurty .... G06F 17/30289 717/101 |
| 2006/0230349 A1 * | 10/2006 | Novak ................... G06F 11/324 715/700 |
| 2008/0010372 A1 * | 1/2008 | Khedouri ............. G11B 27/034 709/224 |
| 2009/0157732 A1 * | 6/2009 | Hao ................... H04M 3/53325 |
| 2011/0269424 A1 * | 11/2011 | Multer et al. ................. 455/411 |
| 2012/0011143 A1 * | 1/2012 | Nash et al. ................... 707/769 |
| 2012/0089572 A1 * | 4/2012 | Raichstein .......... G06F 11/1461 707/645 |
| 2012/0190386 A1 * | 7/2012 | Anderson ................. 455/456.3 |

* cited by examiner

*Primary Examiner* — John B Walsh
(74) *Attorney, Agent, or Firm* — Kunzler Bean & Adamson, PC

(57) ABSTRACT

A data sync engine, a related method and software achieve keeping the data set of a core computer system and a mobile device in sync so that a user may perform operations using several different devices connectable to the core computer system.

15 Claims, 2 Drawing Sheets

DATA SYNC ENGINE, METHOD AND SOFTWARE

BACKGROUND

The invention relates to the field of synchronizing data between a core computer system and one or more devices which may connect to and interact with the core computer system from time to time. As an illustrative example for the purposes of this document, a personal financial management ("PFM") software system is used as an example. A personal financial management software system can allow a user to view bank account balances and transactions, move money from one account to another, pay bills, conduct personal budgeting, and perform other functions.

In the prior art, a PFM software system stored user data on a core computer system. A user could use another computing device, such as a mobile computing device ("MCD"), to connect to the core computer system and download the user's data. Currently smart phones are popular MCDs. However, tablet computers, laptop computers, and other electronic devices can be used as MCD's. On the MCD the user can review his or her downloaded data. If the MCD remains connected to the core computer system, then the user can also change the data or perform other transactions with the core computer system. But if the user does not remain connected to the core computer system, then the user is limited to reviewing data downloaded to the MCD.

The prior art situation posed several inconvenient problems for the user and for the provider of the core computer system. First, a user who lost connectivity with the core computer system, such as due to loss of internet connection, lost the ability to edit data or conduct transactions. Second, even while editing data or conducting transactions, a user was faced with inherent slowness of the connection to the core computer system or slowness of the core computer system itself. Third, in order to support simultaneous on-line transaction processing for numerous users, both the core computer system and its connectivity for users needed to be very robust and therefore expensive. Also, connections with multiple devices must be managed.

SUMMARY

A system, method and software are needed which allow multiple devices to connect to and share data with a core computer system in a fashion that synchronizes data among the various devices. For maximum usability, the system, method and software should allow devices that periodically connect to the core computer system to conduct transactions and edit data when not connected to the core computer system. This will allow users not connected to the core computer system to still enjoy the full functionality of their software application. It will also allow users to enjoy the speed inherent in their MCD without experiencing slowness of a connection to a core computer system or slowness of the core computer system itself.

DETAILED DESCRIPTION

Figure 1:
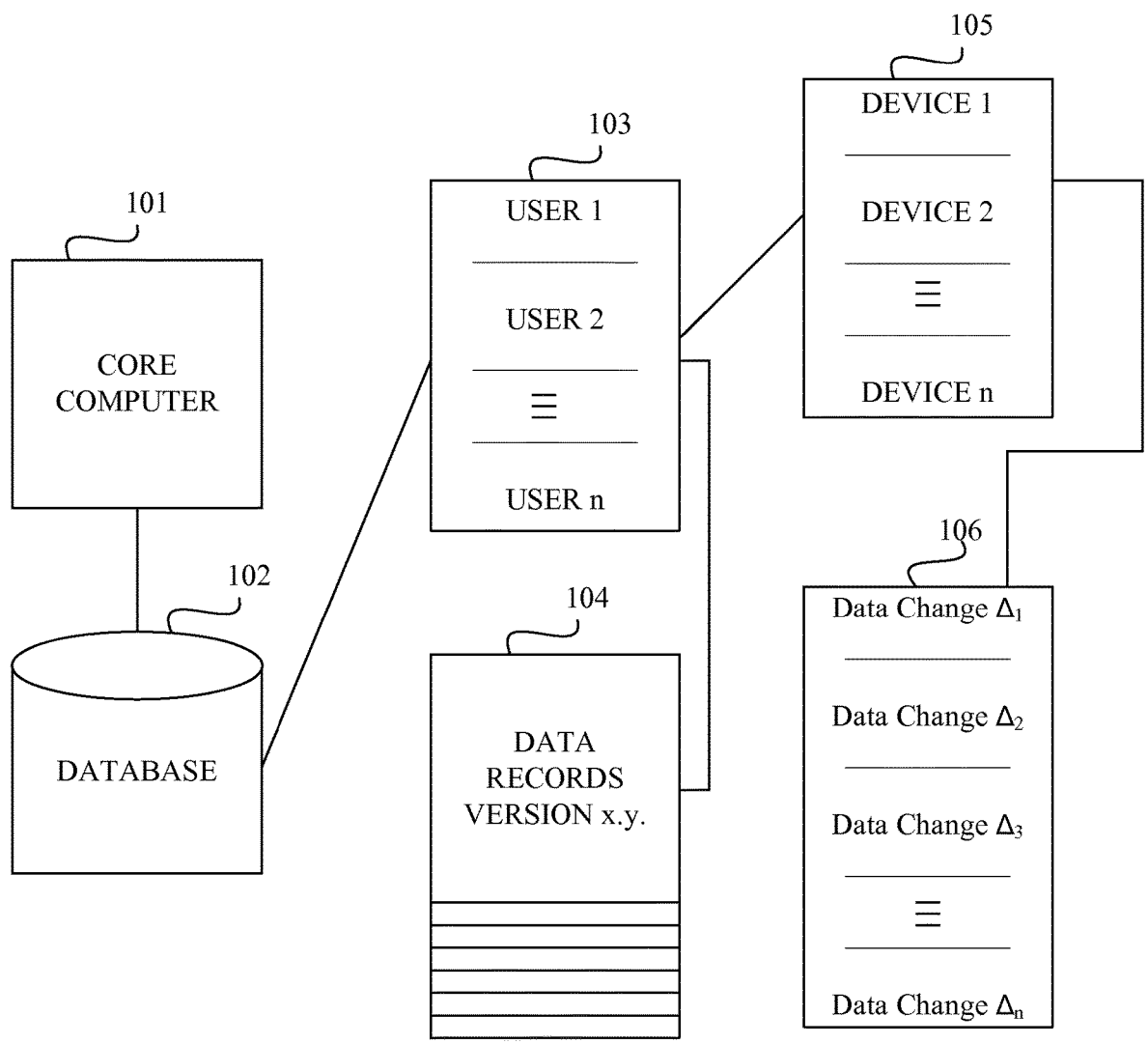
FIG. 1 depicts a core computer system, its database, and information that it may contain.

Referring to FIG. 1 an example embodiment of the invented system is depicted. A core computer system 101 for a software application, such as a PFM program, is shown. The core computer system 101 has a database 102 on which data for the PFM for all of its users may be stored. The database 102 can include information such as a list of users 103 including user 1, user 2, . . . up to user n where n is a positive integer. That list of users can include various user information, such as user account information, security information, etc. For each user, such as user 2, a list of enabled computing devices 105 is kept. These devices such as device 1, device 2, . . . device n, can include devices such as a desktop computer, a laptop computer, a notebook computer, a tablet computer, a smart phone, and another type of device capable of communicating with the core computer system 101. Also for each user such as user 2, the database 102 can contain data records 104 pertaining to that user. In the example of a PFM, the data records could include various information about bank accounts, account transactions, bills that need to be paid, bills that have already been paid, personal budget information, etc. For each device 105 that can connect to the core computer system for a particular user, in this case device 2 for user 2, the database 102 may store a number of data changes 106, such as data change δ1 through data change δn, which need to be made to data on device 2 for user 2 in order to sync the data of device 2 with data in the database 102 of the core computer system.

In the example of a PFM software system, the data changes δ1 through δn could be changes coming from third parties, such as interest paid on bank accounts reported by the relevant financial institutions and which need to be reflected on all copies of the user's data. Or the data changes could be due to changes in the database made by the user through a different device. For example, if the user connected to the core computer system through device 5 and entered a transaction, such as payment of a bill, then data reflecting that change would not exist on the copy of the user's data maintained in device 3. Therefore the core computer system keeps a record that the data change made to the core computer system needs to be made for each other device up to device n. When each device connects to the core computer system, then the data change can be made to or published to that particular device. For more detail on this, see FIG. 2.

Figure 2:
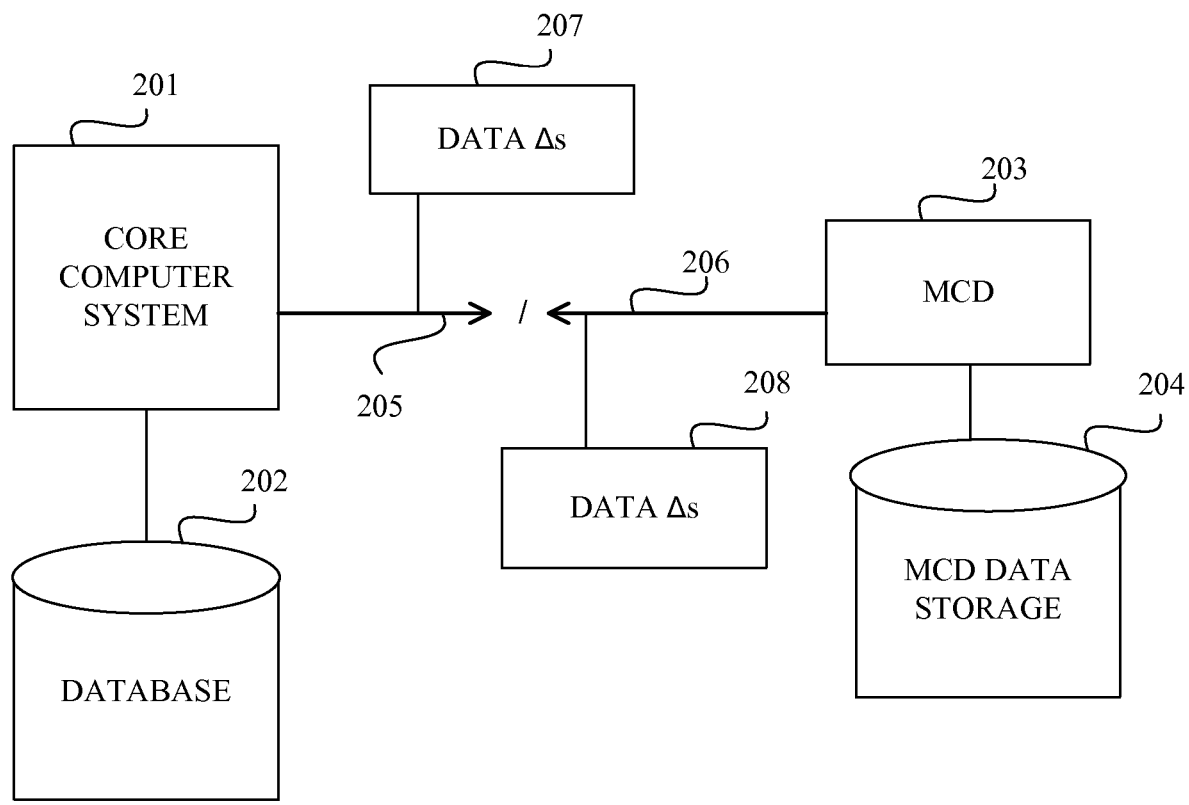
FIG. 2 depicts connection of a core computer system with another device and the data and data record changes which may be shared between them.

Referring to FIG. 2, a depiction of data change transactions between a core computer system and a device connectable to it is provided. The core computer system 201 has a database 202 for storing user data. The core computer system is at least periodically in connection with an MCD 203. The connection can be via any desired connection means, including but not limited to the Internet. The MCD had an MCD data storage 204 where it can store user data. The database 202 of the core computer system may have changes to data for a particular user which need to be implemented on that user's devices. In that event, for each device, there will be an applicable set of data changes 207 on the core computer system which can be transmitted 205 to the MCD in order to update the MCD's data set. Likewise, then an MCD user is not connected to the core computer system and makes changes to his or her data, then those changes need to be reflected in the core computer system database data set. Therefore when the MDC is connected to the core computer system, the MCD data changes 208 are transmitted 206 to the core computer system and the contents of the core computer system are updated. This allows the data storage of the core computer system and the MCD to be brought into sync.

It is important for the core computer system to keep a record of the last changes to the data set on each of a user's devices. And the core computer must keep track of changes to its own data set which have not yet been made on the user's various devices. This will allow the core computer system to notify a user's device of the need to update its data set whenever a user's device connects to the core computer system, thus keeping data sets in sync. The core computer system can keep track of the types of changes on a record-by-record basis (such as created, updated, deleted) so that the next time a device connects to the core computer system, those data records can be updated in the device's data set. This could occur by the core computer system forcing the user device to update its data set, such as by the core computer system sending out a syncpackage of data to be updated, or by the user device requesting the core computer system to provide it with updated data. In the event that a syncpackage is used, it can be pre-filtered to send only the types of data changes desired rather than sending all data changes, if filtering is appropriate.

At the completion of the sync process, whether the core computer system is updating a user device or whether a user device is updating the core computer system, it is possible for the data changes which were stored for the sync process to be purged. This could occur by the device that is being updated sending a delete request or a sync token indicating that the desired data changes have been made successfully, so the record of those proposed data changes can be deleted.

It is also possible to set up the core computer system so that it keeps track of which devices know about which data changes. Therefore it is possible for the core computer system to separately notify each user device of the particular data changes that the device in question does not know about yet. That enables the core computer system to immediately bring any particular device up to date with its data changes as soon as that device connects to the core computer system. Because only the data which is changed is downloaded to the user device, data transfer is rapid. The user device can signal the core computer system that it successfully received the data changes with a handshake or other protocol. Then the core computer system starts with a blank slate of proposed data changes for that particular device until more data changes are made.

It is possible for the core computer system to require a user device to download a fresh complete data set instead of downloading just data changes. This could be done if the number of data changes is deemed too large and a complete data set download is preferable. Or it could be done if the user device data set is stale due to age, for example if a device has not connected to the core computer system for 90 days or some other predetermined period of time.

The core computer system can also be updated with push notifications (typically sent for individual changes). This allows the core computer system to push or force a data update on a user device rather than waiting for a device to request data sync. The core computer system can open a socket and talk to the user device to provide real time updates. Push notifications can be real-time daily, or according to whatever threshold the software designer feels is most appropriate.

On the user device side, data-state tracking can also be used, permitting the user device to keep track of all data records that were created, updated or deleted so that appropriate data changes may be sent to the core computer system. In such case, the user device notes which data changes have occurred since the last data sync and prepares them for upload to the core computer system when connection next occurs. The data changes can be ordered as desired to guarantee certain relationships (i.e., categories and transactions, so that a transaction is tied to an appropriate category, establishment of a new category when required to support the transaction, etc.). Then the user device can push the data to the core computer system.

The system can also be designed to maintain a status code for each proposed data change. Status codes can indicate which data changes were successful and which ones were not, returning a message to the user for unsuccessful data changes. Status codes can indicate a successful or unsuccessful data change, as well as action to be taken. For example, (i) clear the data state, (ii) keep it the same, (iii) show an error state.

The invention can be implemented as software that runs on a digital computer. The state of technology and trends as of the time of writing this document indicates that digital computers running software will be a preferred implementation for many years to come. For the purposes of this document, the term "digital computer" includes desktop computers, laptop computers, tablet computers, hand-held mobile electronic devices (including so-called smart phones), other mobile electronic devices, networked computers, mainframe computers, and other computing devices. Other computing devices may include analog computing devices, quantum computing devices, biological computing devices and other computing devices. Although the invention can be implemented as software operating on a computing device, the invention can also be implemented as firmware or it may be implemented in hardware or otherwise as desired. Such implementations are intended to be within the scope of the invention.

Commonly a computing device for using the invention will include a display device such as a screen or other image on which information can be displayed to a user, an input device through which a user can control the computing device, and a processor for carrying out computations as required by the invention. The computing device may also include a means for carrying wireless transmission and receipt of data, dynamic memory, static memory, a power source such as a battery, and other features.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for synchronizing data between a core computer system and a user device comprising the steps of:
   maintaining, for each of a plurality of users, lists of user devices enabled for communicating with a core computer system, the core computer system storing a database of user data for the plurality of users;
   establishing data communications between the core computer system and a plurality of user devices from one of the lists of user devices, the user devices associated with one user of the plurality of users;
   sending user data for the one user from the core computer system to the associated user devices;
   on the core computer system, maintaining lists of data changes, for the one user, made to the database of user data which have not yet been made for the associated user devices, each list of data changes associated with one of the user devices associated with the user;

ordering the data changes to maintain relationships with the user data, the relationships comprising a relationship between a transaction and a transaction category so that a transaction is tied to an appropriate category, wherein a new transaction category is established when necessary to support a transaction;

prefiltering the data changes for the one of the associated user devices such that only desired types of data changes are used to update the user data on the one of the associated user devices, the data changes comprising created records, updated records, and deleted records;

when one of the associated user devices is in data communication with the core computer system:
 using push notifications to force real-time individual changes of the user data on the one of the associated user devices using lists of data changes associated with the one of the associated user devices in response to the one of the associated user devices having connected to the core computer system within a predetermined period of time;
 otherwise, forcing the one of the associated user devices to download a complete set of the user data from the core computer system in response to the one of the associated user devices not having connected to the core computer system within the predetermined period of time;
 deleting a list of the data changes for the one of the associated user devices in response to receiving a sync token that indicates that the desired data changes have been made successfully; and generating and storing within the core computer system different records of the last changes made to update user data on each of the associated user devices for the one user.

2. The method of claim 1, wherein one or more of the user devices is a mobile computing device.

3. The method of claim 1, wherein using one of the lists of data changes to update user data comprises providing the data changes to the one of the associated user devices in response to a request from the one of the associated user devices.

4. The method of claim 1, wherein the lists of data changes comprise data changes from a third party source.

5. The method of claim 4, wherein the third party data source comprises a bank.

6. The method of claim 1, further comprising determining whether a number of data changes exceeds a threshold and, when the number of data changes exceed the threshold, requiring the one of the associated user devices to download a complete data set rather than downloading data changes.

7. The method of claim 1, further comprising receiving data state tracking data from at least one of the associated user devices.

8. The method of claim 7, wherein the data state tracking data comprises one or more of updated data, new data and deleted data reflecting data changes made on the at least one of the associated user devices.

9. A system for synchronizing data between a core computer system and a mobile device, wherein, using a processor, the core computer system is configured to:
 maintain, for each of a plurality of users, lists of user devices enabled for communicating with the core computer system, the core computer system storing a database of user data for the plurality of users;
 establish data communications between then core computer system and a plurality of user devices from one of the lists of user devices, the user devices associated with one user of the plurality of users;
 send user data for the one user from the core computer system to the associated user devices;
 maintain lists of data changes, for the one user, made to the database of user data which have not yet been made for the associated user devices, each list of data changes associated with one of the user devices associated with the user;
 order the data changes to maintain relationships with the user data, the relationships comprising a relationship between a transaction and a transaction category so that a transaction is tied to an appropriate category, wherein a new transaction category is established when necessary to support a transaction;
 prefilter the data changes for the one of the associated user devices such that only desired types of data changes are used to update the user data on the one of the associated user devices, the data changes comprising created records, updated records, and deleted records;
 when one of the associated user devices is in data communication with the core computing system:
  use push notifications to force real-time individual changes of the user data on the one of the associated user devices using lists of data changes associated with the one of the associated user devices in response to the one of the associated user devices having connected to the core computer system within a predetermined period of time;
  otherwise, force the one of the associated user devices to download a complete set of the user data from the core computer system in response to the one of the associated user devices not having connected to the core computer system within the predetermined period of time;
  delete a list of the data changes for the one of the associated user devices in response to receiving a sync token that indicates that the desired data changes have been made successfully; and
 generate and store within the core computing system different records of the last changes made to update user data on each of the associated user devices for the one user.

10. The system of claim 9, wherein one or more of the user devices comprises a smart phone.

11. The system of claim 9, wherein the system is configured to use one of the lists of data changes to update the user data by providing the data changes to the one of the associated use devices in response to a request from the one of the associated user devices.

12. The system of claim 9, wherein the system is further configured to receive data state tracking data from at least one of the associated user devices.

13. The system of claim 12, wherein the data state tracking data comprises one or more of updated data, new data and deleted data reflecting data changes on the at least one of the associated user devices.

14. The system of claim 12, wherein the data state tracking data comprises indications of data changes made on the at least one of the associated user devices while the at least one of the associated user devices was offline.

15. A non-transitory computer readable storage media storing instructions that, when executed by one or more processors, cause the processors to:
- maintain, for each of a plurality of users, lists of user devices enabled for communicating with the core computer system, the core computer system storing a database of user data for the plurality of users;
- establish data communications between then core computer system and a plurality of user devices from one of the lists of user devices, the user devices associated with one user of the plurality of users;
- send user data for the one user from the core computer system to the associated user devices;
- maintain lists of data changes, for the one user, made to the database of user data on said the mobile device which have not yet been made for the associated user devices, each list of data changes associated with one of the user devices associated with the user;
- order the data changes to maintain relationships with the user data, the relationships comprising a relationship between a transaction and a transaction category so that a transaction is tied to an appropriate category, wherein a new transaction category is established when necessary to support a transaction;
- prefilter the data changes for the one of the associated user devices such that only desired types of data changes are used to update the user data on the one of the associated user devices, the data changes comprising created records, updated records, and deleted records;
- when one of the associated user devices is in data communication with the core computing system:
  - use push notifications to force real-time individual changes of the user data on the one of the associated user devices using lists of data changes associated with the one of the associated user devices in response to the one of the associated user devices having connected to the core computer system within a predetermined period of time;
  - otherwise, force the one of the associated user devices to download a complete set of the user data from the core computer system in response to the one of the associated user devices not having connected to the core computer system within the predetermined period of time;
  - delete a list of the data changes for the one of the associated user devices in response to receiving a sync token that indicates that the desired data changes have been made successfully; and
- generate and store within the core computing system different records of the last changes made to update user data on each of the associated user devices for the one user.

* * * * *